United States Patent
Eldering

(10) Patent No.: US 8,150,422 B2
(45) Date of Patent: Apr. 3, 2012

(54) METHOD OF DISPLAYING CONTACT INFORMATION

(75) Inventor: Charles A. Eldering, Furlong, PA (US)

(73) Assignee: TEPA Datasolutions Co., LLC, Wilminton, DE (US)

(*) Notice: Subject to any disclaimer, the term of this patent is extended or adjusted under 35 U.S.C. 154(b) by 930 days.

(21) Appl. No.: 11/624,935

(22) Filed: Jan. 19, 2007

(65) Prior Publication Data
US 2008/0176585 A1 Jul. 24, 2008

(51) Int. Cl.
*H04W 24/00* (2009.01)
*H04B 1/38* (2006.01)

(52) U.S. Cl. ............ 455/457; 455/456.6; 455/566

(58) Field of Classification Search ......... 455/456.1, 455/456.3, 456.6, 457, 566, 456.2, 456.5
See application file for complete search history.

(56) References Cited

U.S. PATENT DOCUMENTS

| | | | |
|---|---|---|---|
| 6,101,480 A | 8/2000 | Conmy et al. | |
| 6,205,478 B1 | 3/2001 | Sugano et al. | |
| 6,219,694 B1 | 4/2001 | Lazaridis | |
| 6,269,369 B1 | 7/2001 | Robertson | |
| 6,385,591 B1 | 5/2002 | Mankoff | |
| 6,529,724 B1 | 3/2003 | Khazaka et al. | |
| 6,728,886 B1 | 4/2004 | Ji et al. | |
| 6,873,841 B1 | 3/2005 | Sagar | |
| 6,883,000 B1 | 4/2005 | Gropper | |
| 7,570,959 B2 * | 8/2009 | Nurmi | 455/456.1 |
| 7,620,404 B2 * | 11/2009 | Chesnais et al. | 455/456.1 |
| 7,664,485 B2 * | 2/2010 | Twerdahl et al. | 455/408 |
| 2002/0068551 A1 | 6/2002 | Strunk | |
| 2003/0050045 A1 | 3/2003 | Kennedy | |
| 2003/0084331 A1 | 5/2003 | Dixon et al. | |
| 2003/0119561 A1 * | 6/2003 | Hatch et al. | 455/566 |
| 2003/0208369 A1 | 11/2003 | Chamberlain | |
| 2003/0236769 A1 | 12/2003 | Pyhalammi | |
| 2004/0068572 A1 | 4/2004 | Wu | |
| 2004/0077363 A1 | 4/2004 | Lazaro | |
| 2004/0120316 A1 | 6/2004 | McCormack et al. | |
| 2004/0199921 A1 | 10/2004 | Snader | |
| 2004/0203556 A1 | 10/2004 | Litwin | |
| 2004/0203598 A1 | 10/2004 | Aerrabotu | |
| 2004/0259574 A1 * | 12/2004 | Daniels et al. | 455/456.3 |
| 2005/0015432 A1 | 1/2005 | Cohen | |
| 2005/0027716 A1 | 2/2005 | Apfel | |
| 2005/0032527 A1 | 2/2005 | Sheha et al. | |

(Continued)

FOREIGN PATENT DOCUMENTS
WO 2005/060228 A1 6/2005

OTHER PUBLICATIONS

Hansell, Saul, "Google and Yahoo Aim at Another Screen", New York Times, Jan. 6, 2006, www.nytimes.com, 3 pgs.

(Continued)

*Primary Examiner* — Christopher M Brandt

(57) ABSTRACT

A method of displaying contact information on a mobile device includes storing a plurality of contact records on a mobile device. At least one record contains information corresponding to the geographic location of at least one of the contacts. The geographic location of the mobile device is determined and compared with the geographic location of the contacts stored on the mobile device. The contacts are arranged based on the geographic proximity of the contact to the mobile device.

20 Claims, 23 Drawing Sheets

USER ZIPCODE: 267-880-1720

| CONTACT ID | CONTACT NAME | CONTACT PHONE # [1402] | DISTANCE FROM USER [1404] |
|---|---|---|---|
| 164-896 | ADAM MELNICK | 215-628-4811 | 11.96 MILES |
| 122-555 | JOHN SMITH | 215-671-0931 | 16.81 MILES |
| 326-478 | DAVID ROSS | 404-222-1111 | 682.39 MILES |
| 123-555 | MELISSA JONES | 202-481-1891 | 140.63 MILES |
| 124-555 | ALEX JOHNSTON | 310-607-2154 | 2401.99 MILES |
| 125-555 | JERRY FULLER | 215-271-8931 | 26.80 MILES |

CONTACT REORDERING BY AREA CODE/EXCHANGE

U.S. PATENT DOCUMENTS

| | | | |
|---|---|---|---|
| 2005/0065980 A1 | 3/2005 | Hyatt | |
| 2005/0136901 A1 | 6/2005 | Jung | |
| 2005/0170845 A1* | 8/2005 | Moran | 455/456.1 |
| 2005/0208930 A1* | 9/2005 | Zmrzli | 455/414.4 |
| 2005/0243993 A1 | 11/2005 | McKinzie et al. | |
| 2006/0027648 A1 | 2/2006 | Cheah | |
| 2006/0030369 A1* | 2/2006 | Yang | 455/566 |
| 2006/0063548 A1* | 3/2006 | Kim | 455/518 |
| 2006/0155750 A1 | 7/2006 | Fowler et al. | |
| 2007/0042800 A1* | 2/2007 | Tani | 455/550.1 |
| 2007/0054661 A1* | 3/2007 | Park et al. | 455/418 |
| 2007/0135136 A1* | 6/2007 | Ische | 455/456.1 |
| 2007/0149208 A1* | 6/2007 | Syrbe et al. | 455/456.1 |
| 2007/0178915 A1* | 8/2007 | Khan | 455/457 |
| 2007/0213034 A1* | 9/2007 | Cai et al. | 455/412.1 |
| 2007/0249327 A1* | 10/2007 | Nurmi | 455/414.1 |
| 2007/0276739 A1 | 11/2007 | Mathew et al. | |
| 2007/0287474 A1* | 12/2007 | Jenkins et al. | 455/456.2 |
| 2008/0005263 A1* | 1/2008 | Baraev et al. | 709/217 |
| 2008/0132243 A1* | 6/2008 | Spalink et al. | 455/456.1 |
| 2008/0132252 A1* | 6/2008 | Altman et al. | 455/457 |
| 2008/0153508 A1* | 6/2008 | Hao et al. | 455/456.2 |
| 2008/0161059 A1* | 7/2008 | Kraft et al. | 455/566 |
| 2008/0167944 A1 | 7/2008 | Keithley et al. | |
| 2008/0222127 A1 | 9/2008 | Bergin | |
| 2010/0069045 A1* | 3/2010 | Grignani et al. | 455/414.1 |

OTHER PUBLICATIONS

Martens, China, "Funambol opens portal, looks to push e-mail", Computerworld, Feb. 11, 2005, www.computerworld.com.

Malik, Om, "The Next Monopoly", Business 2.0, Mar. 2005, pp. 75-80 and 82.

Baker, Tracy, "Convergence is Coming, Be Prepared", CE Lifestyles, Mar. 2005, pp. 44-48, 57-58.

Office Action issued by the United States Patent and Trademark Office dated Mar. 29, 2011 in reference to U.S. Appl. No. 11/624,962.

Office Action issued by the United States Patent and Trademark Office dated Jan. 21, 2011 in reference to U.S. Appl. No. 11/624,935.

* cited by examiner

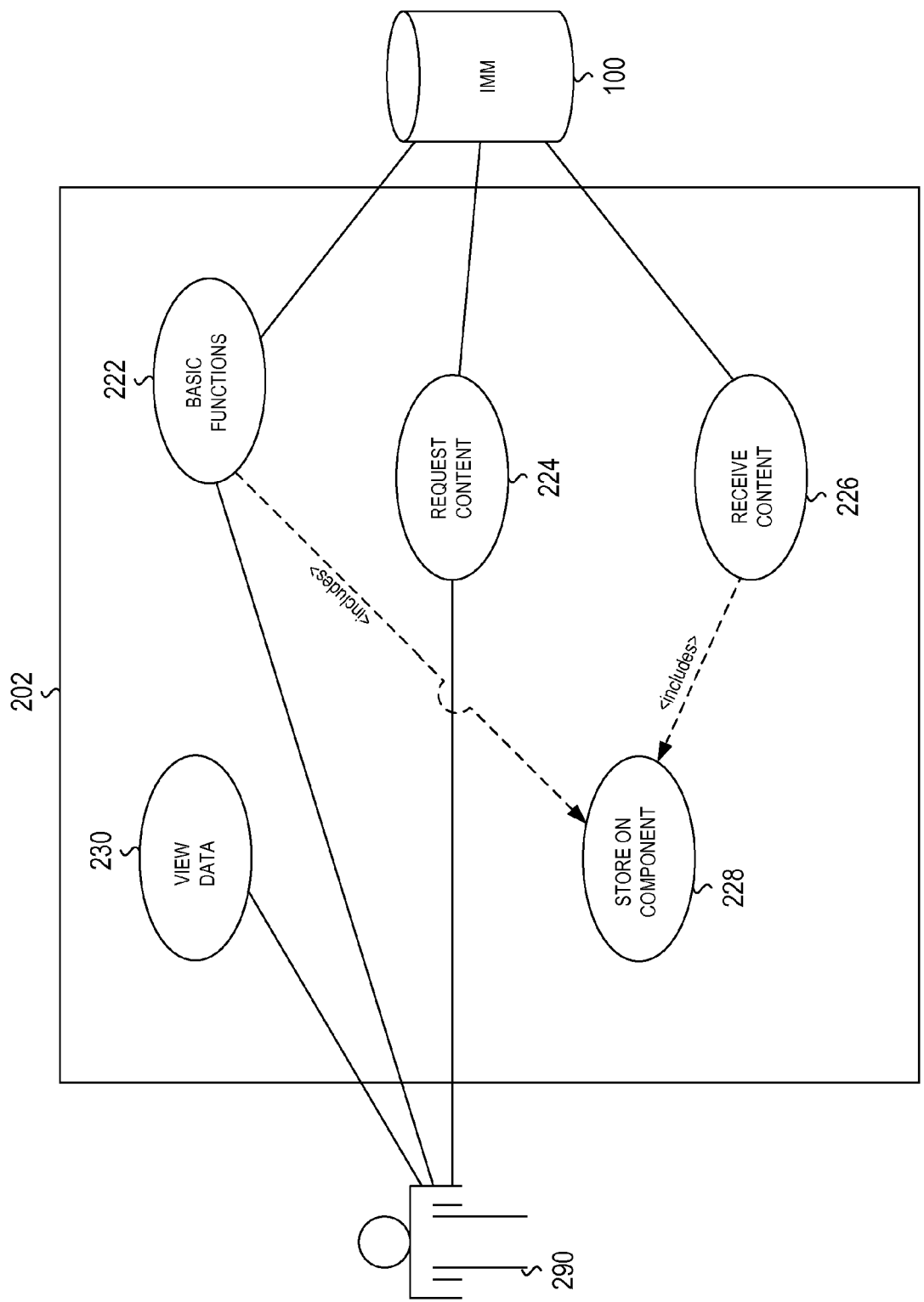

| CONTACT FIELD HEADING | CONTACT FIELD DATA | DIRECTIVE FIELD DATA |
| --- | --- | --- |
| CONTACT ID | 123-987-456 | SERVER |
| NAME | John Doe | SERVER, CELL PHONE, HOME PC, WORK PC, PDA |
| HOME ADDRESS | 2200 Fake Street | SERVER, CELL PHONE, HOME PC |
| HOME PHONE # | 215-555-4665 | SERVER, CELL PHONE, HOME PC |
| WORK ADDRESS | 123 Pine Street | SERVER, CELL PHONE, WORK PC, PDA |
| WORK PHONE # | 267-555-1720 x555 | SERVER, CELL PHONE, WORK PC, PDA |
| PERSONAL EMAIL | JohnDoe@personal.com | SERVER, HOME PC |
| BUSINESS EMAIL | JohnDoe@Work.com | SERVER, WORK PC, PDA |
| CELL PHONE # | 202-555-2343 | SERVER, CELL PHONE, HOME PC, WORK PC, PDA |
| NOTES | Patent Attorney | SERVER, HOME PC, WORK PC, PDA |

712 — CONTACT FIELD HEADING
714 — CONTACT FIELD DATA
716 — DIRECTIVE FIELD DATA

LIST DIRECTIVE

*Fig. 6*

| CONTACT FIELD HEADING | CONTACT FIELD DATA | DIRECTIVE FIELD DATA |
|---|---|---|
| CONTACT ID | 123-987-456 | SERVER |
| NAME | John Doe | ALL |
| HOME ADDRESS | 2200 Fake Street | PERSONAL |
| HOME PHONE # | 215-555-4665 | PERSONAL |
| WORK ADDRESS | 123 Pine Street | BUSINESS |
| WORK PHONE # | 267-555-1720 x555 | BUSINESS |
| PERSONAL EMAIL | JohnDoe@personal.com | HYBRID 1 |
| BUSINESS EMAIL | JohnDoe@Work.com | HYBRID 2 |
| CELL PHONE # | 202-555-2343 | ALL |
| NOTES | Patent Attorney | HYBRID 3 |

GROUP DIRECTIVES

*Fig. 7A*

| GROUP ID | GROUP DIRECTIVE INFORMATION |
|---|---|
| ALL | SERVER, CELL PHONE, HOME PC, WORK PC, PDA |
| SERVER | SERVER |
| PERSONAL | SERVER, CELL PHONE, HOME PC |
| BUSINESS | SERVER, CELL PHONE, WORK PC, PDA |
| HYBRID 1 | SERVER, HOME PC |
| HYBRID 2 | SERVER, WORK PC, PDA |
| HYBRID 3 | SERVER, HOME PC, WORK PC, PDA |

708 — GROUP ID
710 — GROUP DIRECTIVE INFORMATION

GEOGRAPHIC DIRECTIVES

*Fig. 7B*

| CONTACT FIELD HEADING | CONTACT FIELD DATA | DIRECTIVE FIELD DATA 1 | DIRECTIVE FIELD DATA 2 |
|---|---|---|---|
| CONTACT ID | 123-987-456 | SERVER | EVERYWHERE |
| NAME | John Doe | ALL | EVERYWHERE |
| HOME ADDRESS | 2200 Fake Street, Philadelphia, PA | PERSONAL | PHILADELPHIA |
| HOME PHONE # | 215-555-4665 | PERSONAL | PHILADELPHIA |
| WORK ADDRESS | 123 Pine Street, Doylestown, PA | BUSINESS | DOYLESTOWN |
| WORK PHONE # | 267-555-1720 x555 | BUSINESS | DOYLESTOWN |
| PERSONAL EMAIL | JohnDoe@personal.com | HYBRID 1 | EVERYWHERE |
| BUSINESS EMAIL | JohnDoe@work.com | HYBRID 2 | EVERYWHERE |
| CELL PHONE # | 202-555-2343 | ALL | EVERYWHERE |
| ALTERNATE ADDRESS | 1305 Pacific Ave., San Diego, CA | HYBRID 4 | SAN DIEGO |
| ALTERNATE PHONE # | 315-555-6464 | HYBRID 4 | SAN DIEGO |
| NOTES | Patent Attorney | HYBRID 3 | EVERYWHERE |

GEOGRAPHIC DIRECTIVES

*Fig. 8A*

| GROUP ID | GROUP DIRECTIVE INFORMATION |
|---|---|
| ALL | SERVER, CELL PHONE, HOME PC, WORK PC, PDA |
| SERVER | SERVER |
| PERSONAL | SERVER, CELL PHONE, HOME PC |
| BUSINESS | SERVER, CELL PHONE, WORK PC, PDA |
| HYBRID 1 | SERVER, HOME PC |
| HYBRID 2 | SERVER, WORK PC, PDA |
| HYBRID 3 | SERVER, HOME PC, WORK PC, PDA |
| HYBRID 4 | SERVER, CELL PHONE |

708 — GROUP ID
710 — GROUP DIRECTIVE INFORMATION

*Fig. 8B*

| GROUP ID | GROUP DIRECTIVE INFORMATION |
|---|---|
| EVERYWHERE | DISPLAY INDEPENDENT OF GEOGRAPHY |
| PHILADELPHIA | PHILADELPHIA |
| DOYLESTOWN | DOYLESTOWN |
| SAN DIEGO | SAN DIEGO |

730 — GROUP ID
732 — GROUP DIRECTIVE INFORMATION

*Fig. 8C*

| CONTACT FIELD HEADING | CONTACT FIELD DATA | DIRECTIVE FIELD DATA 1 | DIRECTIVE FIELD DATA 2 |
|---|---|---|---|
| CONTACT ID | 123-987-456 | SERVER | ANYTIME |
| NAME | John Doe | ALL | ANYTIME |
| HOME ADDRESS | 2200 Fake Street, Philadelphia, PA | PERSONAL | ANYTIME |
| HOME PHONE # | 215-555-4665 | PERSONAL | AFTER HOURS |
| WORK ADDRESS | 123 Pine Street, Doylestown, PA | BUSINESS | WORK HOURS |
| WORK PHONE # | 267-555-1720 x555 | BUSINESS | WORK HOURS |
| PERSONAL EMAIL | JohnDoe@personal.com | HYBRID 1 | AFTER HOURS |
| BUSINESS EMAIL | JohnDoe@work.com | HYBRID 2 | ANYTIME |
| CELL PHONE # | 202-555-2343 | ALL | ANYTIME |
| ALTERNATE ADDRESS | 1305 Pacific Ave., San Diego, CA | HYBRID 4 | ANYTIME |
| ALTERNATE PHONE # | 315-555-6464 | HYBRID 4 | ANYTIME |
| NOTES | Patent Attorney | HYBRID 3 | ANYTIME |

TIME OF DAY DIRECTIVES

*Fig. 9A*

| GROUP ID | GROUP DIRECTIVE INFORMATION |
|---|---|
| ALL | SERVER, CELL PHONE, HOME PC, WORK PC, PDA |
| SERVER | SERVER |
| PERSONAL | SERVER, CELL PHONE, HOME PC |
| BUSINESS | SERVER, CELL PHONE, WORK PC, PDA |
| HYBRID 1 | SERVER, HOME PC |
| HYBRID 2 | SERVER, WORK PC, PDA |
| HYBRID 3 | SERVER, HOME PC, WORK PC, PDA |
| HYBRID 4 | SERVER, CELL PHONE |

*Fig. 9B*

| GROUP ID | GROUP DIRECTIVE INFORMATION |
|---|---|
| ANYTIME | ANYTIME |
| AFTER HOURS | 12 AM – 9AM, 5PM – 12AM |
| WORK HOURS | 8AM – 6PM |

*Fig. 9C*

USER LOCATION: 40, 39 N 75, 26 W

| CONTACT ID | CONTACT NAME | CONTACT LATITUDE | CONTACT LONGITUDE | DISTANCE FROM CONTACT TO USER |
|---|---|---|---|---|
| 164-896 | ADAM MELNICK | 45.27N | 98.26W | 1510.76 MILES |
| 122-555 | JOHN SMITH | 39.53N | 75.15W | 59.77 MILES |
| 326-478 | DAVID ROSS | 31.48N | 106.24W | 1829.98 MILES |
| 123-555 | MELISSA JONES | 40.18 N | 78.19W | 155.27 MILES |
| 124-555 | ALEX JOHNSTON | 40.52N | 79.54W | 225.42 MILES |
| 125-555 | JERRY FULLER | 39.58N | 75.38W | 56.39 MILES |

CONTACT DISTANCE TABLE

*Fig. 10*

USER ZIPCODE: 18901

| CONTACT ID | CONTACT NAME | CONTACT ZIPCODE 1202 | DISTANCE FROM ZIPCODE 1204 |
|---|---|---|---|
| 164-896 | ADAM MELNICK | 19046 | 15.98 MILES |
| 122-555 | JOHN SMITH | 22202 | 144.90 MILES |
| 326-478 | DAVID ROSS | 19130 | 25.31 MILES |
| 123-555 | MELISSA JONES | 20006 | 142.66 MILES |
| 124-555 | ALEX JOHNSTON | 15122 | 251.45 MILES |
| 125-555 | JERRY FULLER | 15203 | 255.77 MILES |

CONTACT REORDERING BY ZIPCODE

*Fig. 12*

USER ZIPCODE: 267-880-1720

| CONTACT ID | CONTACT NAME | CONTACT PHONE # | DISTANCE FROM USER |
|---|---|---|---|
| 164-896 | ADAM MELNICK | 215-628-4811 | 11.96 MILES |
| 122-555 | JOHN SMITH | 215-671-0931 | 16.81 MILES |
| 326-478 | DAVID ROSS | 404-222-1111 | 682.39 MILES |
| 123-555 | MELISSA JONES | 202-481-1891 | 140.63 MILES |
| 124-555 | ALEX JOHNSTON | 310-607-2154 | 2401.99 MILES |
| 125-555 | JERRY FULLER | 215-271-8931 | 26.80 MILES |

CONTACT REORDERING BY AREA CODE/EXCHANGE

*Fig. 14A*

| CONTACT | LAST CALLED | LAST RECEIVED | CALLS IN PERIOD | TOTAL MINUTES | LAST LOCATION |
|---|---|---|---|---|---|
| JANE DELTON | 07/25/05 | 06/28/05 | 12 | 72 | (215) |
| KEITH SMITH | 03/10/05 | 10/05/04 | 11 | 35 | (415) |
| ⋮ | | | | | |
| JACOB HOLMAN | 06/11/05 | 05/01/05 | 7 | 20 | (610) |
| KURT JONES | 04/09/04 | 05/10/04 | 3 | 10 | (215) |
| LARRY PICKENS | 01/12/04 | 02/03/04 | 0 | 3 | (650) |

*Fig. 15A*

METHOD OF DISPLAYING CONTACT INFORMATION

CROSS REFERENCE TO RELATED APPLICATIONS

This application is related to co-pending U.S. patent application Ser. No. 11/624,910, entitled Method of Distributing Contact and Calendar Records, filed Jan. 19, 2007; U.S. patent application Ser. No. 11/624,922, entitled Method of Distributing Contact and Calendar Records, filed Jan. 19, 2007; U.S. patent application Ser. No. 11/624,950, entitled Method of Displaying Contact Information, filed Jan. 19, 2007; U.S. patent application Ser. No. 11/624,962, entitled Method of Distributing Contact Information to Merchant Websites, filed Jan. 19, 2007; and U.S. patent application Ser. No. 11/624,970, entitled Method of Updating Contact Information on Merchant Websites, filed Jan. 19, 2007, the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings:

FIG. 3B is a use case diagram of a component device in accordance with the contact and calendar record delivery system of FIG. 1;

FIG. 6 is a table showing an example of list directive data;

FIG. 7A is a table showing an example of a contact record with group directive field data;

FIG. 7B is a table showing an example of group directive data;

FIG. 8A is a table showing an example of a contact record with two types of directive data;

FIG. 8B is a table showing an example of group directive data;

FIG. 8C is a table showing an example of geographic directive data;

FIG. 9A is a table showing an example of a contact record with two types of directive data;

FIG. 9B is a table showing an example of group directive data;

FIG. 9C is a table showing an example of time of day directive data;

FIG. 10 is a table showing data relating to contact reordering using geographic distances obtained through GPS;

FIG. 12 is a table showing data relating to contact reordering using geographic distances obtained through zip codes;

FIG. 14A is a table showing data relating to contact reordering using geographic distances obtained through area codes and exchanges;

FIG. 15A is an example of the output from contact reordering using geographic distances obtained through area codes and exchanges;

DETAILED DESCRIPTION

Figure 1:
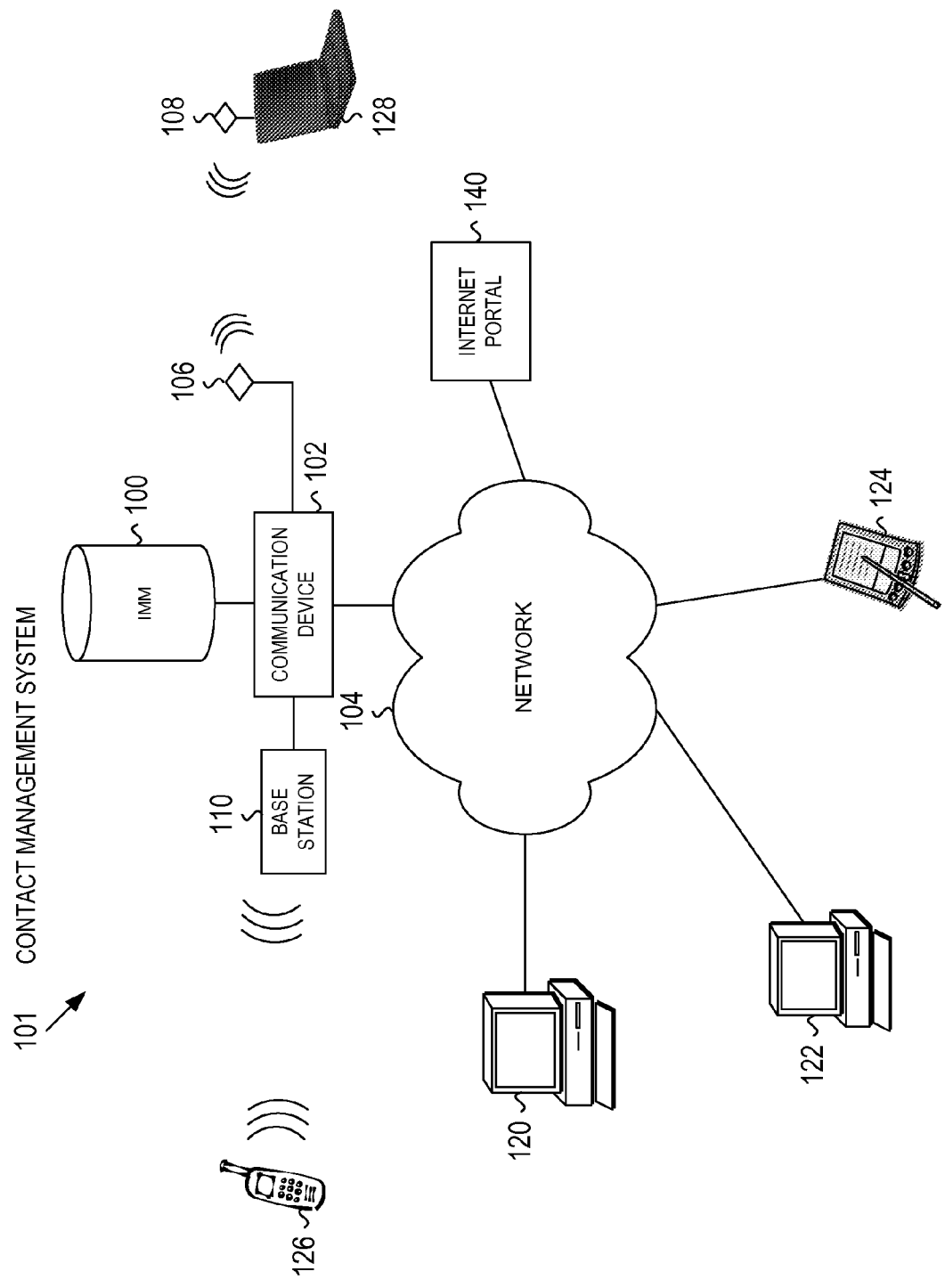
FIG. 1 is a system diagram of one embodiment of a contact and calendar record delivery system.

Certain terminology is used herein for convenience only and is no t to be taken as a limitation on the embodiments of the present invention. In the drawings, the same reference letters are employed for designating the same elements throughout the several figures.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

In accordance with the multiple embodiments of the present invention, a contact management system distributes contact or calendar records to a plurality of devices. The contact management system ensures that a user's devices have access to the most current appropriate contact or calendar information. The user, or in some cases the administrator, chooses which records or part(s) of records will be distributed to which component devices. In one embodiment the contact management system is automated so that no user interaction is needed. In an alternate embodiment the contact management system distributes records through user record selection, such that some or all of the records are explicitly selected for distribution to individual devices by a user. The contact management system thus ensures that the desired items appear or can be edited by the appropriate devices and/or users. Devices associated with the contact management system receive information remotely in order to maintain a current record. Additionally, in some embodiments, the devices are displayed in an ordered structure where the most desired contacts are ordered first and less desired contacts are ordered to appear later or do not appear at all.

Referring to FIG. 1, a contact management system 101 for distributing contact or calendar records to devices belonging to a single user is shown. In alternate embodiments, the devices to which the calendar or contact information is distributed belong to a plurality or group of users. A contact record is generally any file or other unit of data which contains information relating to personal, professional or other information corresponding to a contact, such as name, address and phone number. A contact may be an individual, entity, group or organization with some connection to the user, such as a colleague, a business or a friend. A calendar record is generally a file or other unit of data which contains information relating to a specific event, such as an appointment or a meeting. A calendar record may contain time and date information, information relating to individuals associated with the entry, location information as well as other information relevant to the calendar entry. Contact and calendar records are generally known by those skilled in the art, thus further description of them has been omitted. The contact management system 101 manages and autonomously distributes contact or calendar records to the plurality of component devices. As shown in FIG. 1, the component devices include a home PC 120, a work PC 122, a personal digital assistant (PDA) 124, a cell phone 126 and a local PC 128, although any device capable of receiving contact and calendar records could be used. An information management module 100 maintains the plurality of contact or calendar records for distribution and determines which of the plurality of devices the record will be distributed to based on directives. A directive is data or information that indicates properties about a contact or calendar record, including which devices the record should be distributed to, the priority of the record, the privacy features associated with the record, display features and any other information which indicates properties of a record. Based on the directives, the information management module 100 distributes the records to the component devices through a communication system 102.

The information management module 100 can be implemented via a personal computer, an external hard drive, a server or any device capable of storing information and transmitting the contact or calendar information to a device. The information management module 100 processes the data related to the plurality of contact or calendar records and prepares the contact or calendar record for distribution. Such processing includes managing data, interpreting the directives, determining which devices the records are to be distributed to, determining the method of distribution and completing any other pre-distribution processing. The pre-distribution processing may include buffering of data in preparation for distribution, virus checking, integrity checking, error checking and any other operations needed to prepare data for transmission. In an alternative embodiment some or all of the processing is accomplished by the communication system 102.

The information management module 100 stores the contact and calendar records in an electronic medium. The information management module 100 may be implemented using commercially available software such as Microsoft Outlook® or other similar products. Alternatively, the records can be maintained in a proprietary database or any other data structure. The database which stores the records can be a relational database, a flat file database, an object oriented database or any other database capable of holding the appropriate information In one embodiment, the information management module 100 contains information related to the format of the component devices and the information management module 100 formats the corresponding records accordingly in preparation for distribution. The information management module 100 formats the records prior to sending the records to the communications system 102 for distribution. In an alternate embodiment, the files are formatted by the component devices after they are received. Alternatively, the information management module 100 and the component devices use the same format, in which case no formatting, or minimal formatting, is necessary.

As discussed, the information management module 100 sends the records to the communications system 102 for distribution to the component devices. The communications system 102 may be any device or employ any interface or other system capable of communicating the contents of a record to the relevant component device. The connection between information management module 100 and the communication system 102 may be any connection used for data transfer, such as a Universal Serial Bus (USB) connection, an Ethernet connection, a serial connection, a wireless connection such as 802.11g or any other connection generally used with a computer. The information management module 100 and the communications system 102 can be located locally, near the user of the system, or held in an offsite location by a third party. In the event that a third party, such as a telecommunications company, provides the communication system 102 at an offsite location, the Internet can serve as the connection between the information management module 100 and the communication system 102. In an alternate embodiment, the information management module 100 and the communications system 102 are a single component such as a computer with the appropriate communication channels to facilitate communication to the plurality of component devices and a hard disk drive or other electronic storage to store the records.

As shown in FIG. 1, the communications system 102 connects to the component devices through a network 104, a base station 110, a wireless networking device 106, and/or whatever means are appropriate depending on the capabilities or requirements of the component devices. The network 104 may be the Internet, a local intranet, a direct connection or any other network capable of facilitating communications between the communications system 102 and the component devices. The base station 110 is a device used to communicate with component devices using cell phone technology. The wireless networking device 106 is a wireless device used to connect with devices located within the range of the wireless networking device 106. The communications system 102 may be connected to the network 104, base station 110, wireless networking device 106 and any other communication device which may be used through a T1 line, a cable modem or a DSL line, a modem, a computer connection such as USB, wireless connections such as 802.11n or Blue Tooth or any other connection capable of providing the appropriate bandwidth for distribution of the contact and calendar records.

In one embodiment, the wireless networking device 106 is a wireless router using IEEE 802.11n or similar standard and the wireless networking device 108 is a wireless networking card using the same or compatible standard. In an alternate embodiment, the wireless networking devices 106 and 108 are connected through a standardized communication technology such as Blue Tooth. Information management module 100 and communication system 102 maintain records of information related to the component devices to facilitate communication. This information includes, but is not limited to, a device's network address, IP address, MAC address, phone number or other identifying information.

In one embodiment the contact management system 101 monitors information originating from outside the contact management system 101 to ensure that the user's own personal information is not altered or deleted. Alternatively, there may be information distributed to the devices that an administrator of the system would like to delete upon a user leaving the system. The contact management system 101 maintains records of distribution information to facilitate a deletion process which leaves private data untouched while completely deleting other information. In one embodiment, the system maintains a history record of information which has been distributed. The history record can be stored on the information management system 100 or any other device capable of holding this information. The history record maintains information about which fields and records have been sent or received and which device sent or received such information. When a user or device is deleted from the system, the information management system 100, in conjunction with the communications system 102, deletes the information from the user's device which has been added to that device by the information management system 101 by comparing the device's information to the history record. In an alternate embodiment contact and calendar records and fields are flagged when received by the user device. A flag is a Boolean variable or other indicator which determines whether that contact or calendar record originated from the user locally or from the contact management system 101. When the contact management system 101 deletes a user or device's information it deletes the flagged records, thereby only deleting information originated from the system.

Figure 3A:
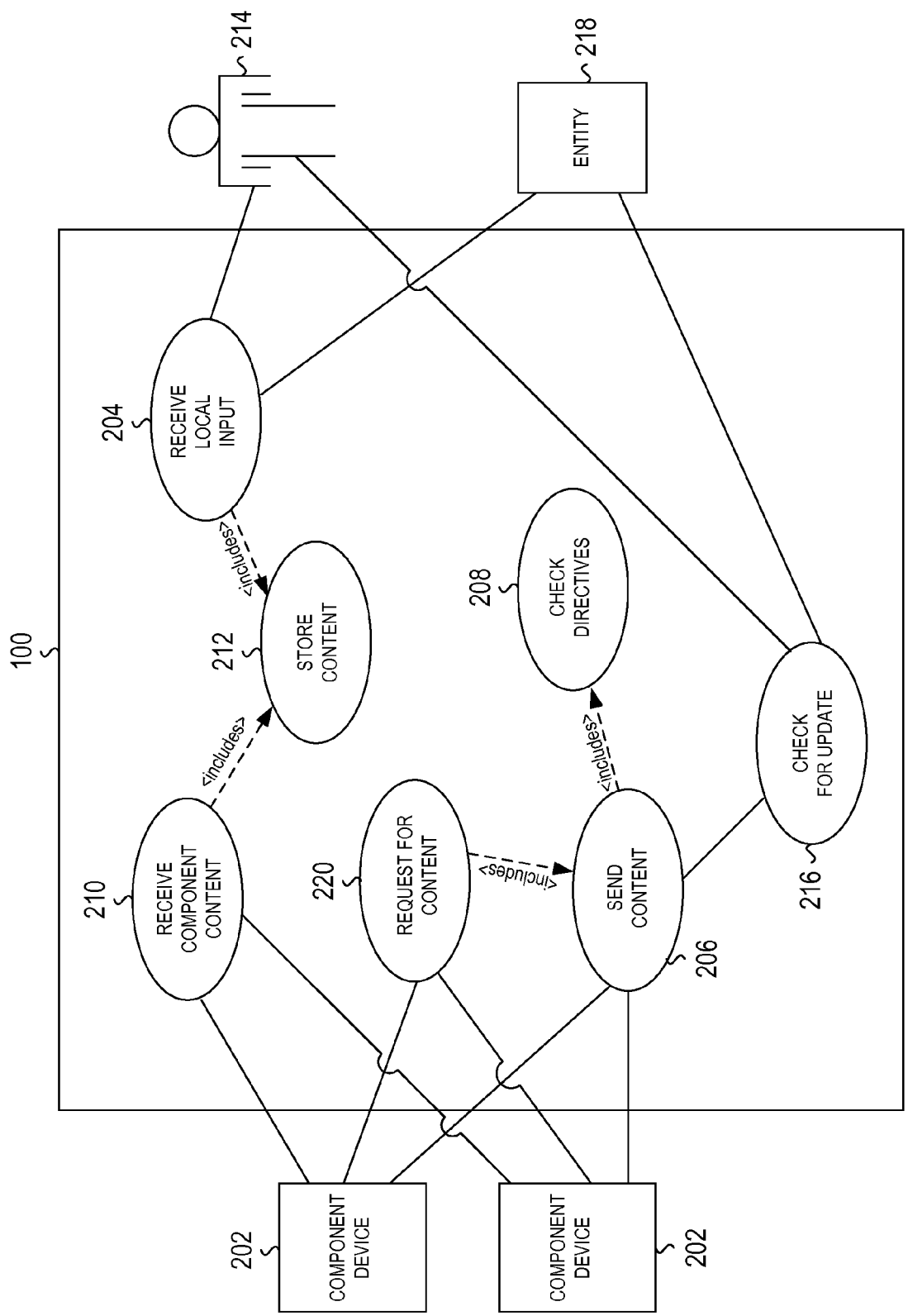
FIG. 3A is a use case diagram of an information management module in accordance with the contact and calendar record delivery system of FIG. 1.

FIG. 3A is a use case diagram of the information management module 100. Component devices 202 include component devices a user of the contact management system 101 could use as described with reference to FIG. 1, including the home PC 120, work PC 122, PDA 124, cell phone 126, local PC 128 or any other device capable of receiving contact or calendar information. The information management module 100 receives new content at the receive component content use case 210 and the receive local input use case 204. The received content can be calendar and contact record information or any other information. The receive component content use case 210 receives content from one or more of the component devices 202. The store content use case 212 stores content received by the receive component content use case 210 in the information management module 100. The receive local input use case 204 receives input from a local user 214 and/or any other entity 218. The local user 214 is a user who inputs information directly to the information management module 100 and submits requests or information through an input device. The entity/system 218 is any entity or system which is not a component device that submits a request for information to the information management module 100, such as a subsystem managing a user's contacts. The information received by the receive local input use case 204 is stored using the store content use case 212. A request for content use case 220 allows a component device 202 to request an update or some other information from the information management module 100. The send content use case 206 sends the updated content or requested information to component devices. The send content use case 206 includes the check directive use case 208. The check directives use case 208 checks the directives of the information being sent by the send content use case 206 prior to the sending of the information to ensure that the appropriate information is distributed to the one or more component devices 202. The check for update use case 216 checks the information management module for updated information to be sent to the component devices 202 through the send content use case 206 and the check directives use case 208. The check for update use case 216 is initiated by the information management module 100 either automatically through a timer operation or some other similar function or manually when the local user 214 or the entity 218 or a component device 202 or a user using a component device 202 makes such a request. The above discussed communications between the component device 202 and the information management module 100 are facilitated either though communication system 102 (not shown) or alternatively a direct connection between the information management module 100 and the component device 202.

FIG. 3B is a use case diagram of one of the component devices 202. The component device 202 receives input from a user 290. The user 290 is any individual, entity or group using the component device. The view data use case 230 displays data which has been stored on the component device at the request of user 290. The basic functions use case 222 allows the user 290 to add, edit or delete a contact or calendar record from the component device and sends the added, edited or deleted contact or calendar record to the information management module 100. The store on component use case 228 updates the component device 202 by adding, editing or deleting the record or records affected by the basic functions use case 222. The request content use case 224 sends a request for content to the information management module 100. The request can be for every updated record available on the information management module 100 or alternatively the request can be for one or more specific item(s) that user 290 requests. The receive content use case 226 receives any content that the information management module 100 sends to the component device 202 (e.g. updated contact or calendar records). The content received can be the information requested by the component device 202 at the request content use case 224 or any data that the information management module 100 sends to the component device 202. The content received by the receive content use case 226 is stored on the component device at the store component use case 228. The communication between the component device 202 and the information management module 100 can be facilitated using the communication system 102 or alternatively can be a direct connection between the information management module 100 and the component device 202.

Figure 4:
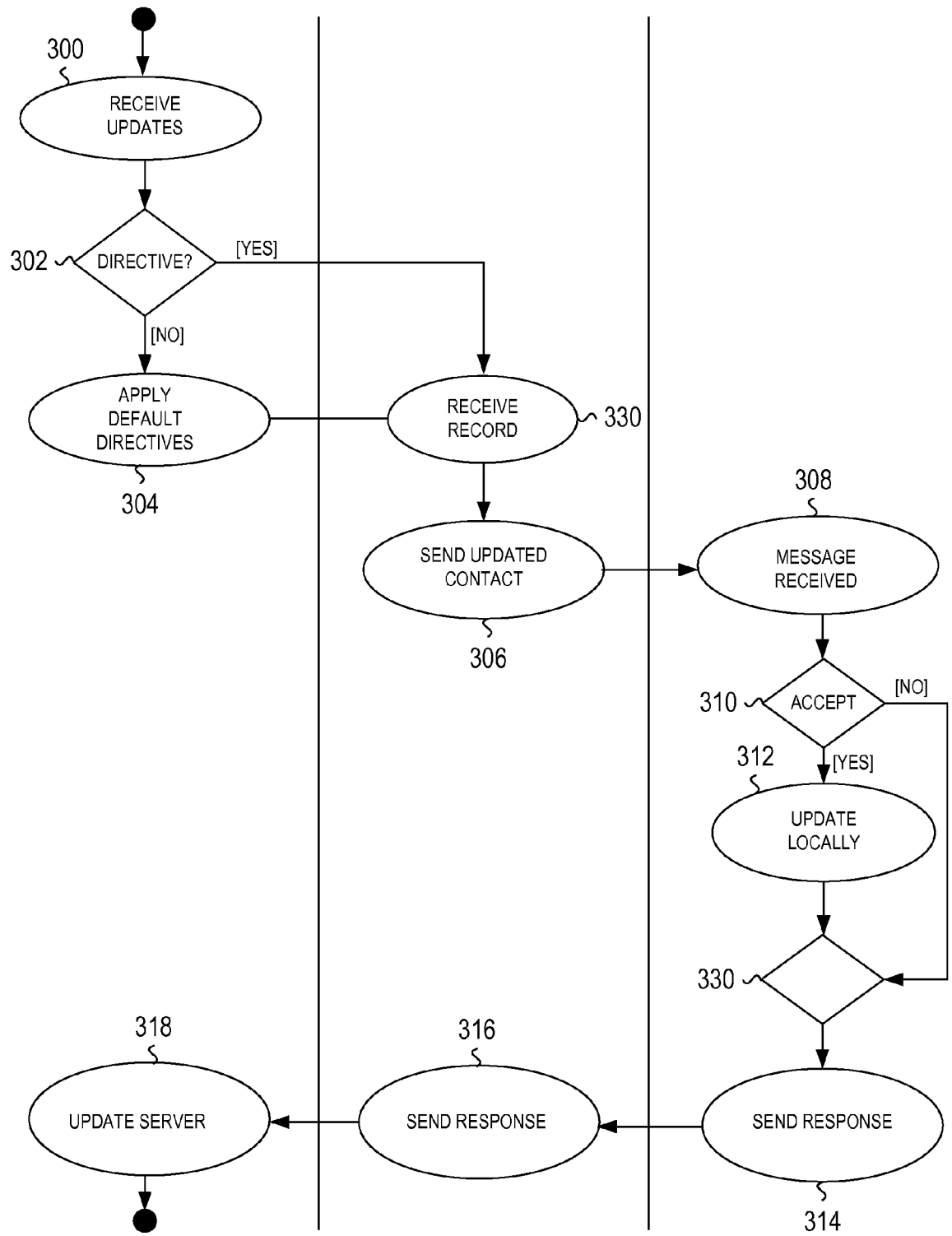
FIG. 4 is an activity diagram of an embodiment of the contact and calendar record delivery system of FIG. 1.

FIG. 4 is an activity diagram corresponding to the contact management system 101. FIG. 4 is an example of the contact management system in a "push" environment, in that the information management module 100 sends information to the component devices whenever a contact record is updated. The information management module 100 receives an update at receive update step 300. The information management module 100 may receive an update from local input into the information management module 100 or from any of the component devices. An update refers to a record which has been newly added, edited or deleted. After an update has been received, the information management module 100 determines if a directive exists for the updated record at the directive test step 302. If, at the directive test step 302, the information management module 100 determines that no directive exists, the information management module applies a default directive at the apply default directive step 304. If, at the directive test step 302, the information management module 100 determines that a directive exists or after the apply default directive step 304 has applied a default directive, the information management module 100 sends the record to the communications system, which is received at the receive record step 330. The communication system 102, in conjunction with the information management module 100, sends the record to the component devices corresponding to the directives at the send updated contact step 306. The record is received by the component device at the message received step 308. At the component device, the record can either be accepted or rejected at the accept test step 310. The record can be accepted or rejected at the component device either by explicit user input or by default settings predetermined by the user. If the record is accepted, the component device updates, creates or deletes the record locally at the update locally step 312, followed by the component device sending a message back to the information management module 100 at the send response step 314. If the record is rejected, the component device sends a response back to the information management module at the send response step 314. The messages sent from the component device at the send response step 314 are received by the communication system 102 and sent to the information management module 100 at the send response step 316. The message is received, interpreted and stored by the information management system 100 at the update server step 318. This entire process is repeated for each individual updated record. Although FIG. 4 is shown with respect to a single received is processed individually, those skilled in the art will understand that more than one record may be processed at the same time.

Figure 5:
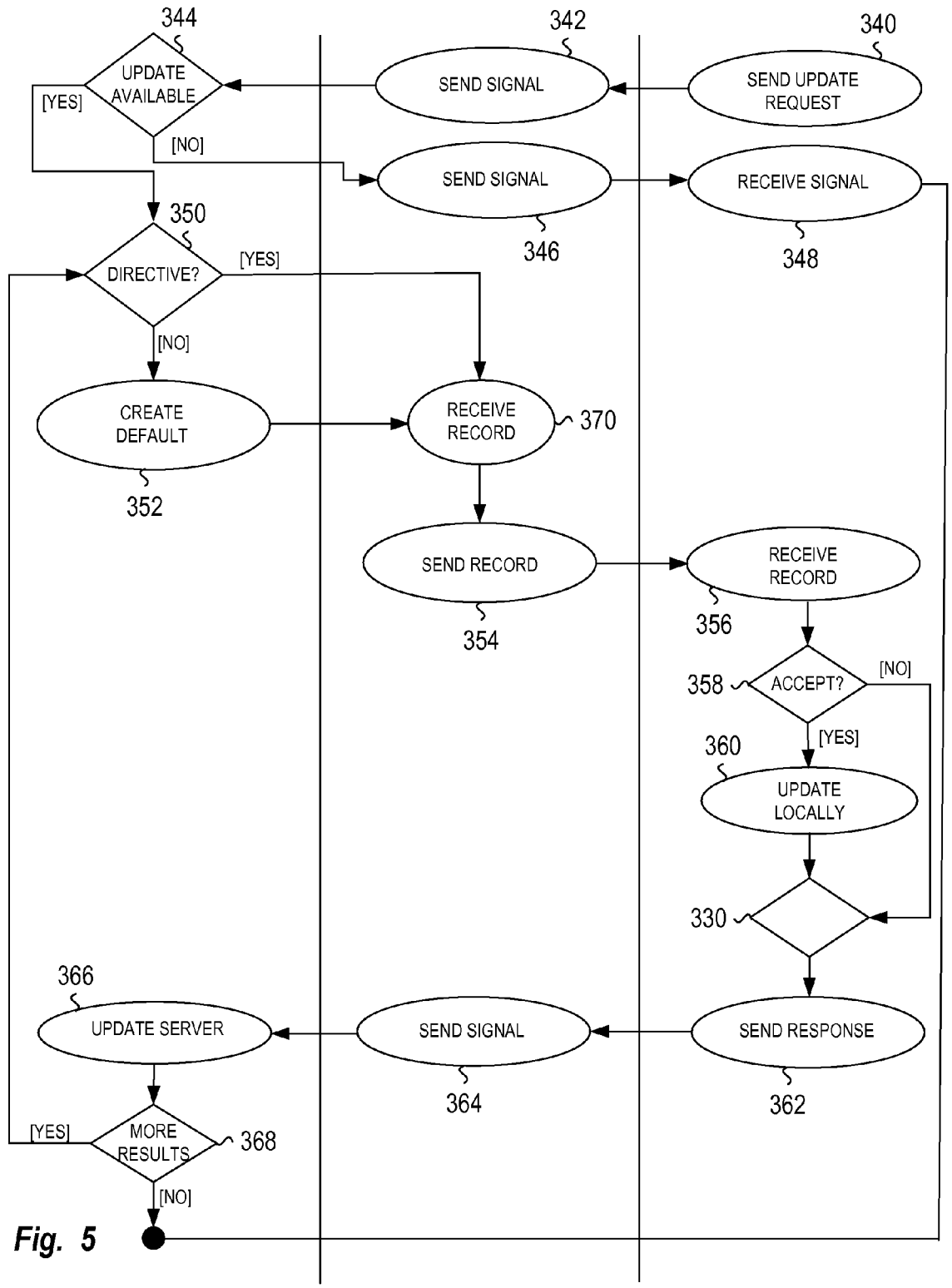
FIG. 5 is an activity diagram of an embodiment of the contact and calendar record delivery system of FIG. 1.

FIG. 5 illustrates an example of the contact management system 101 in a "pull" environment in that the component devices request updated records from the information management module 100. A user at a component device sends a request to receive updated records at the send update request step 340. The component device sends the request to the communication system 102, which receives the request and sends the request to the information management system 100 at the send signal step 342. The message is received by the information management system 100 at the update available test step 344, which determines if any updated records are available to send to the component device. If no updates are available, the information management system 100 sends a response indicating the situation to the component device through the communication system 102 at the send signal step 346. This message is received at the receive signal step 348, which ends the process. If one or more records are available to be sent, the contact management system 101 begins an iterative process of sending the available updated contact records to the component device at the directive test step 350. All steps beginning at the check directive step 350 are repeated for each updated record. The directive test step 350 checks if the current record has a directive. If no directive exists, the information management system 100 creates a default directive at the create default directive step 352 and sends the record and the directive to the communication system 102, which is received at the receive record step 370. If a directive already exists, the information management system 100 sends the record and the directive to the communication system 102, which is received at the receive record step 370. The communication system 102, sends the record, based on the directive, to the proper components at the send record step 354. The component device receives the record at the receive record step 356. The component device can either accept or reject the received record at accept test step 358. This acceptance or rejection is determined either by explicit user entry or by defaults created by the user. If the record is rejected, the component device sends a response indicating the rejection back to the information management system 100 through send response step 362 and send signal step 364. If the record is accepted, the component device updates, creates or deletes the record locally at the update locally step 360. The component device then sends a response indicating the acceptance back to the information management system 100 through send response step 362 and send signal step 364. A response is received by the information management module 100 and stored at the update server step 366. The more results test step 368 determines if more updated records exist to be sent to the component. If more results exist, the contact management system 101 returns to the directives test step 350 and continues the update. If no more results exist, the process is completed. Although in FIG. 5 the records are transmitted in one process, those skilled in the art will recognize that the records could be sent in groups or individually.

A contact or calendar record contains a plurality of fields. A field is composed of a unit of data corresponding to the associated contact or calendar record. Examples of fields include name, home address, home phone number, work addresses, work phone numbers, personal email, business email, contact identification number and any other information relevant to a contact or calendar entry. New fields may be created by a user or an administrator of the contact management system 101.

Directives are pieces of information which direct the contact record. For example, directives may contain information of which component devices receive the associated contact record. Directives also contain information on permissions and authorizations pertaining to a user's ability to view, add, edit or delete an associated contact record or field within that contact record. Directives can also contain information on how a contact record or associated field is ordered and displayed on the component device. Directives are either part of a record or a separate file or piece of data associated with a record.

In one embodiment, directives are files that are associated with individual records or fields and hold necessary distribution and authorization data. In this embodiment, the information management module 100 reads a directive file when distributing the associate record. Based on this directive file, the information management module 100 determines which component device the corresponding record or field within that record should be distributed to, what authorizations or permissions exist for that record and any other ancillary information concerning ordering of the record or display of the record. In an alternate embodiment, a directive is data which is part of the record itself. The record holds data associated with each field. The information management module 100 reads the record to determine the directive information prior to distribution.

One type of directive is a list directive. A list directive is used to determine to which component device a record or field within that record should be distributed. A list directive contains a list of component devices that are associated with a record. FIG. 6 illustrates an example of one contact record's fields, data and the field's list directives. In this example each field has a list directive. The contact field heading column 712 contains the title of each contact field. The contact field data column 714 contains the data associated with each contact field. The directive field data column 716 contains the list directive for the field in that row. In the example of FIG. 6, the fields are Contact ID, Name, Home Address, Home Phone #, Work Address, Work Phone #, Personal Email, Business Email, Cell Phone # and Notes. Each of these field headings has data associated with the field; for example the data contained in the field "name" is "Jon Doe." The communication system 102 performs the appropriate distribution of the record and the fields within that record based on the list directive. Each component device listed in the "directive field data" column will receive the fields associated with the list directive. As shown in FIG. 6, the contact ID remains on the server and is not distributed to any other component devices. The contact name is sent to the users cell phone, home PC, work PC and PDA. From these directives, the communication system 102 determines where to send each individual field based on the list directives.

FIGS. 7A and 7B provide examples of group directives that determine to which component devices a record or field should be distributed by grouping component devices and assigning the directive to fields or records. If a group directive is assigned to a field or record, that field or record will be distributed to the component devices listed in the group directive. FIG. 7B illustrates an example of group directives. The group ID column 708 contains the names of the groups. The group directive information column 710 contains the list component devices associated with the group ID. FIG. 7A contains a single contact record as described in the table in FIG. 6, except the directive field data column 706 contains a group ID rather than a list of component devices. For example, the group with the group ID of "personal" is associated with the server, cell phone and home PC component devices. The fields of "home address" and "home phone #" contain the directive information of "personal." This means that the data in the home address and home phone #fields are to be distributed to the server, the cell phone and the home PC component devices. Groups within the group directives are not typically exclusive, as a component device may be in several or all of the groups. In one embodiment, the information management module 100 maintains group directives in a table or similar data structure with the group names and the corresponding component devices associated with those groups. The contact management system 101 distributes the records or fields associated with the group directive by analyzing the table or other data structure containing the group directive information and distributing the record accordingly.

FIGS. 8A, 8B and 8C provide examples of geographic directives. Additionally, the example of FIGS. 8A, 8B and 8C show the interaction when there are two types of directives applying to the same record or field. Geographic directives are directives used to control the display order of contact records on a component device based on the geographic proximity of a contact. Alternatively, geographic directives control whether a contact record will be displayed at all. For example, geographic directives allow a user of a component device to display their Philadelphia contact records or fields more prominently when using a component device in the Philadelphia area and allows the user to display their non-Philadelphia contact records or fields less prominently or not at all when using a component device in the Philadelphia area. In the example illustrated by FIG. 8A and FIG. 8C show geographic directive information. For each field, the directive field data 2 column 724 indicates the associated geographic directive to the field and the directive field data 1 column 722 indicates the associated group directive to the field. FIG. 8C shows the group ID's and the information associated with the group ID in the group ID column 730 and the information associated with that group ID in the group directive information column 732. If the user of a component device containing the record shown in FIG. 8A were in Philadelphia the component device would display the fields whose directive indicated Philadelphia more prominently than the other fields. Additionally, the directives with the group ID "everywhere" are shown independent of location. Consequently, the fields corresponding to the name, the home address, the home phone number, the personal email, the business email and notes would be shown more prominently to a user of a component device when located in Philadelphia, while the other fields will be displayed less prominently or not at all. If the user on the component device were in San Diego, the fields corresponding to alternate address and alternate phone # would be displayed more prominently along with the fields corresponding to the everywhere geographic directive.

FIGS. 8A, 8B and 8C also illustrate the use of two types of directives simultaneously. In addition to the use of geographic directives, the example in FIGS. 8A, 8B and 8C show the use of group directives as well. A user with the contact record shown in FIG. 8A and the directive information shown in FIG. 8B and FIG. 8C is able to view the contact's home phone number on all of the user's personal devices and the home phone number of the contact record is displayed more prominently when in the user is located in the Philadelphia area. In addition to utilizing the geographic directive information from FIG. 8C, the contact management system 101 utilizes the group directive information from FIG. 8B to determine what information is distributed. In this example, the appropriate information is distributed to the appropriate component devices by using the group directives in FIG. 8B and the distributed information is displayed when appropriate based on the geographic directives illustrated in FIG. 8C.

FIGS. 9A, 9B and 9C illustrate multiple directives in which one of the directives is based upon time of day information and another directive is based on group information. The interaction between these two directives is similar to the interaction between group directives and geographic directives described above. Time of day directives control the prevalence of a record or field based on the time of day. In one embodiment records or fields are displayed at a user determined time of day; in an alternate embodiment the time of day directives effect the ordering of the fields and records, while still displaying all information. In the example illustrated in FIGS. 9A, 9B and 9C, the time of day determines which contact fields can be viewed. FIG. 9C illustrates the time of day directive information. The directive field data 2 column 740 lists, for each field, the associated time of day directive. The group ID column 746 and the group directive information column 748 show the various time of day directives and their corresponding time restraints. For example, during work hours (8 AM-6 PM) the work phone number and address are displayed and during non-work hours (all other times) the home phone number and address are displayed. Alternatively, the time of day directives could apply to the entire record, thereby making the individual records, rather than fields be displayed. In an alternative embodiment similar directives control display of records based on availability of individuals, rather than the time of day. A contact which is known to be unavailable due to a meeting or vacation is not visible or alternatively displayed less prominently. The determination of unavailability can be done through explicit user input or can be done through a comparison of the contact record and a calendar record associated with that contact.

Directives are implemented by a user or administrator setting up each record and field individually by specifying categories of directives (list, group, geographical, time of day, etc.) and applying these directives to fields or records. In one embodiment a pull down menu is utilized to facilitate assignment of directives or other ordering information. In alternate embodiments assignment is accomplished through text entry or any other data entry method. The directive groups can be customized to fit a user's preference or are based on defaults implemented by a user or administrator. Default directives are assigned either when a record is created or alternatively when a record is transmitted. The default directives are selected by the user. For example, a user may implement default settings where phone numbers are sent to their cell phone, while phone numbers and addresses are sent to their PDA. Default directives are available for all types of directives. A user using time of day directives may select that business phone numbers always be displayed more prominently during work hours, while simultaneously setting up geographic default directives to specify that contacts with addresses in Philadelphia are always displayed and contacts with addresses in San Diego are displayed when in San Diego, within a predefined distance of San Diego, perhaps within the state of California of within the Pacific time zone.

In one embodiment, a contact ordering mechanism is implemented through the use of directives. This mechanism can be applied to a variety of devices and systems outside the context of the contact management system 101 described herein. As such, the contact ordering mechanism can be applied to cell phones, PDA's, computers and other component devices containing contact record information.

In one embodiment the contact ordering mechanism enables a user to view contact records based upon geographic proximity to the user's current location. The system determines the present location of the user's device and the present locations of various contacts and reorders the contacts so that more geographically proximate contacts are listed before less geographically proximate contacts. Calculation of the user's position and the position of the relevant contacts may be accomplished using a global positioning satellite (GPS) device, zip code, phone number, cell phone triangulation or any number of different positioning schemes or combinations thereof. Furthermore, since different types of information may be available for different contacts in the user's component device, the distance calculations may be accomplished using a different positioning methodology for different contacts. For example, GPS location and cell phone triangulation are accomplished in real time, while zip code location and phone number location are static. A user could implement the contact display mechanism to use GPS and cell phone triangulation if available and use zip code and phone number location as an alternative when the real time location techniques are unavailable. Additionally, the contact ordering mechanism need not necessarily reorder the entire set of contacts based solely on geographic proximity. For example, the contacts or records may be ordered alphabetically and then reordered within each letter or grouping of letters by geographic proximity.

Figure 11:
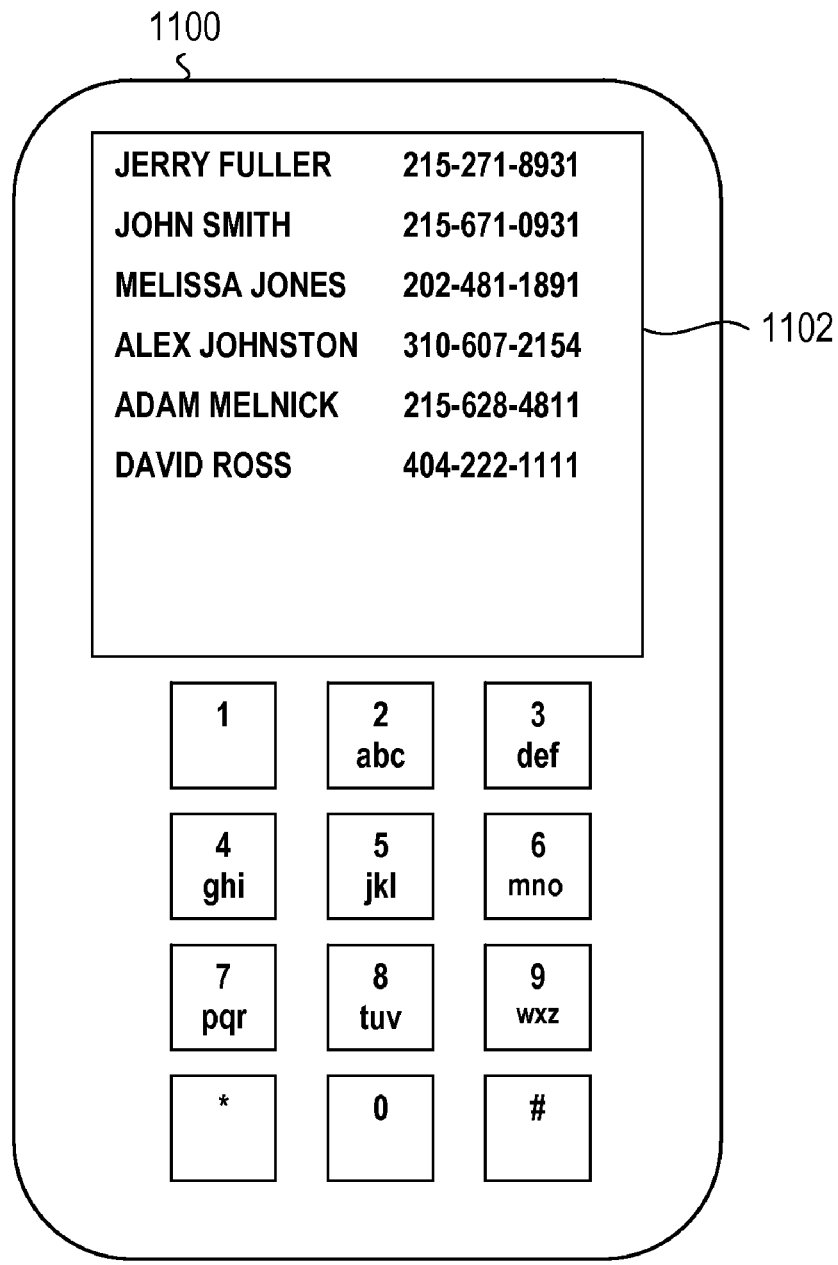
FIG. 11 is an example of the output from contact reordering using geographic distances obtained through GPS.

Depending on the type or source of position data (e.g., GPS, zip code, area code, etc.), the geographic contact ordering mechanism determines the distance between the user's position and the position of one or more of the relevant contacts. The distance calculation made be made using any positioning calculation or algorithm that is generally known in the art to determine distance between two points. FIG. 10 illustrates data when GPS has been used to determine the location of the user and the user's contacts. In this scenario, the geographic contact ordering mechanism requires a user to have a GPS enabled device and the ability to receive GPS location of various contacts. In the example, the GPS on the user's device has calculated the device location at latitude 40.39N and at longitude 75.25W. The user device then determines the latitude and longitude of each contact by locating the GPS signal of each contact's device. Then, using formulas well known in the art, the user device determines the distance of the contacts from the user device. The contact latitude column 1006, the contact longitude column 1008 and the distance from contact to user column 1010 illustrate the information determined by the user device about each contact. Once this process is complete, the device orders the contacts most geographically proximate contacts listed before less geographically proximate contacts. FIG. 11 illustrates the output from the data in FIG. 10 as it might appear on a cell phone 1100. Screen display 1102 shows the contacts as ordered based on GPS.

Figure 13:
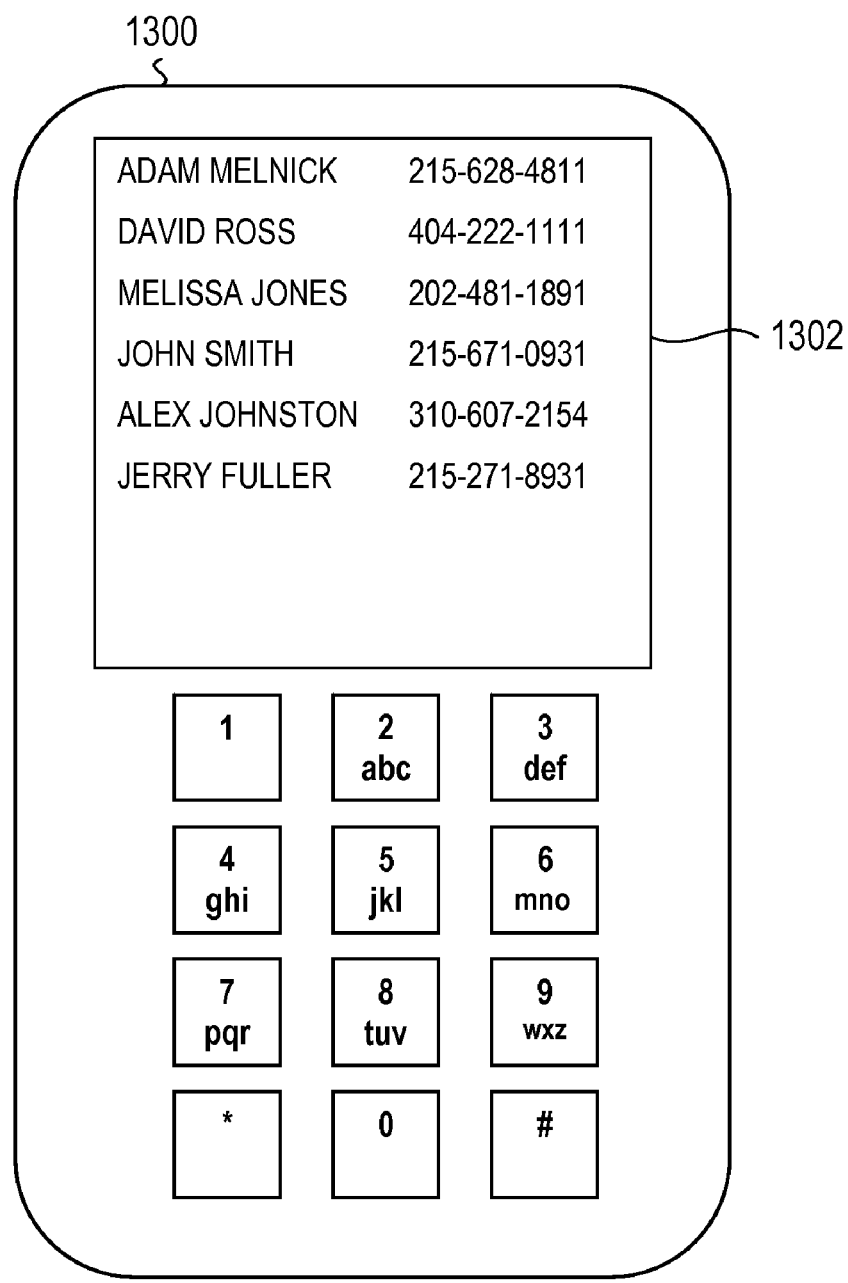
FIG. 13 is an example of the output from contact reordering using geographic distances obtained through zip codes.
Figure 14B:
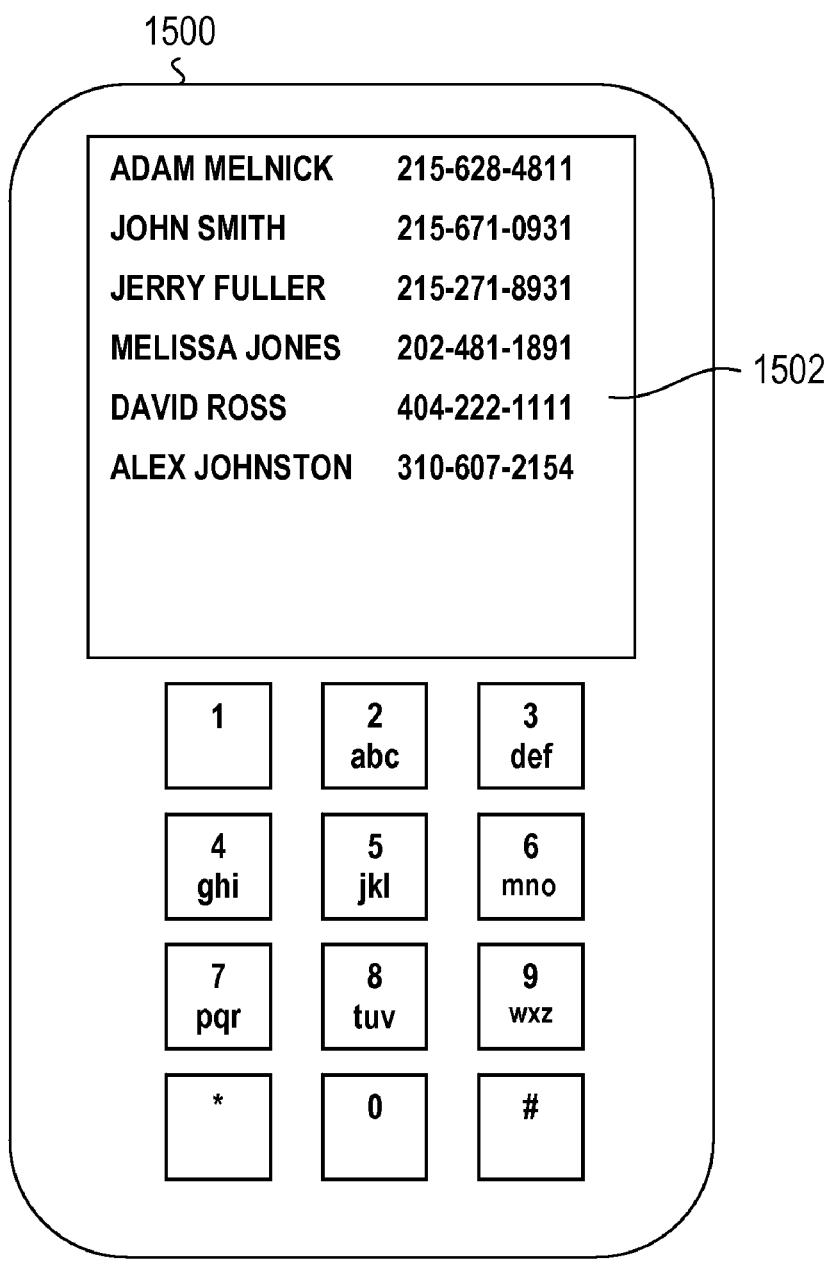
FIG. 14B is an example output from contact reordering using geographic distances obtained through area codes and exchanges.

FIG. 12 illustrates data related to a geographic contact ordering mechanism where zip code is used rather than GPS to determine the distances. The process is similar to the process described above but the algorithm used to determine distance is based on the distance between zip codes rather than the distance being determined based on GPS. The contact zip code column 1202 and distance from zip code 1204 illustrate the distances used in determining ordering. The user's location can be determined based on the user's home zip code, their GPS location, a zip code inputted by the user or any other geographically distinct value. FIG. 13 illustrates the output from the data in FIG. 12 as it might appear on a cell phone 1300. Screen display 1302 shows the contacts as ordered based on zip code. FIG. 14 illustrates data related to a geographic contact ordering mechanism where a user and contact's area code and exchange are used to determine the distances. This process is similar to the above described process. The contact phone number column 1402 and the distance from user column 1404 illustrate the distances determined using area code and exchange. FIG. 14B illustrates the output from the data in FIG. 14A as it might appear on cell phone 1500. Screen display 1502 shows the contacts as ordered based on area code and exchange. In any of the above described geographic contact ordering mechanisms any combination of the distance methods (GPS, area code, zip code or some other distance method) can be used in determining ordered display.

In another embodiment of the contact ordering mechanism, users also have the ability to view records which have been reordered based on statistics. The statistical information is kept by a component device and can include call frequency information, time stamp information, call length information or other information a user selects to maintain statistic on. By utilizing this type of information, a user is able to more easily retrieve desired contact information.

In one embodiment of statistical reordering, contacts are reordered by call frequency information. Call frequency information refers to information related to communications with a contact and includes both incoming communications and outgoing communications. The contact records are ordered so that contacts which are communicated with more frequently have their contact record displayed before contacts which are communicated less frequently. Records are maintained concerning how many communications each contact has with the user's component device. In one embodiment the contact reordering scheme is implemented by maintaining a number indicating the amount of communications with each contact. Each time a communication occurs between a contact and the user's component device the number associated with that contact is incremented. The contact reordering system then orders the contacts based on the number, with the contact records with higher numbers listed before the contacts with lower numbers. In one embodiment, the contact records are ordered by call frequency information pertaining to incoming communications or outgoing communications. In this embodiment each contact record maintains a number for incoming communications and outgoing communications and increments each when appropriate.

Figure 15B:
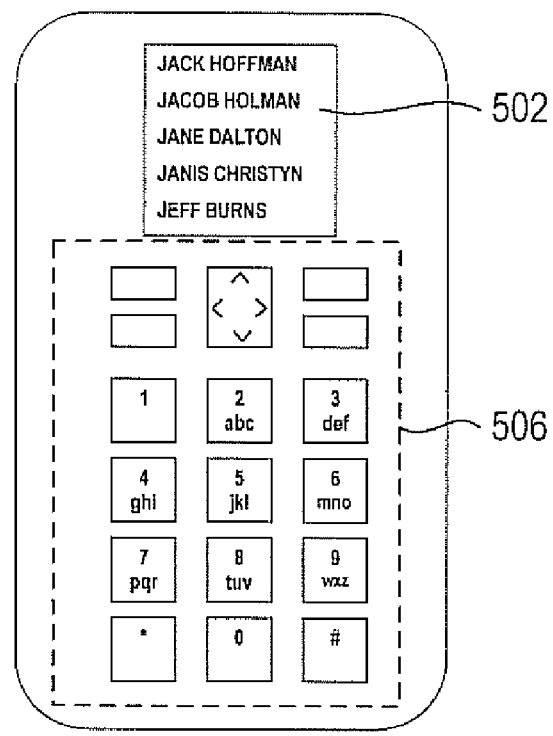
FIG. 15B is table showing data related to contact reordering using statistics related to call frequency information.
Figure 15C:
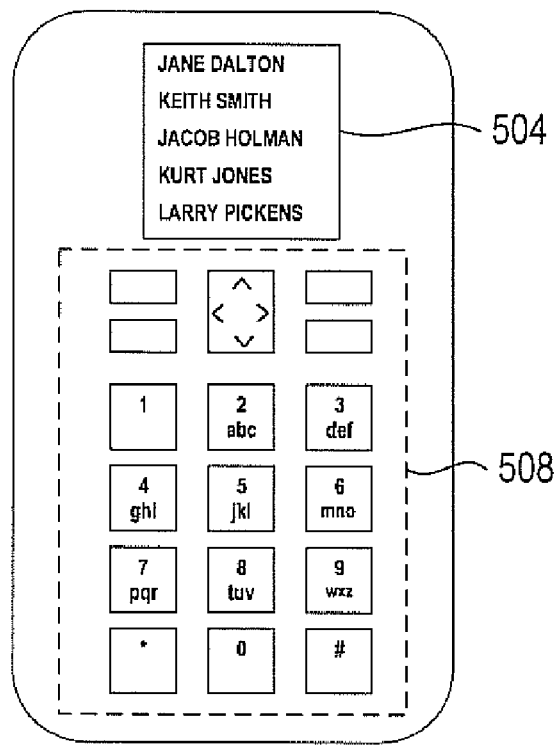
FIG. 15C is an example of the output from contact reordering using statistics related to call frequency information.

FIG. 15A illustrates an example of call statistic information wherein call statistic information related to call frequency information is shown. In this example, contacts which would be shown when the "JKL" button on a cell phone is pressed. FIG. 15B illustrates two cell phone screen displays resulting from the contact list illustrated in FIG. 15A. The cell phone screen display 502 shows contacts displayed alphabetically after pressing the "JKL" key on the keypad 506. The cell phone screen display 504 shows the same contact information, however it is sorted by call frequency information as illustrated in the table in FIG. 15A.

In one embodiment contacts are reordered by call length information wherein contact records with longer aggregate call lengths are ordered before contact records with shorter aggregate call length. In one embodiment, information is maintained by the user device concerning the length of calls as well as the time the calls were begun and whether the call was incoming or outgoing. The contact management system 101 then reorders the contacts based on this statistical information. In one embodiment contacts are reordered based on total call length over the life of the device. The contacts or phone numbers which have longer combined totals for call length are listed prior to contacts or phone numbers with shorter combined totals for call length. In an alternative embodiment the contacts are ordered so that the call length is monitored based on a user defined time and date. In another embodiment the contacts are sorted based on whether they are incoming or outgoing. This embodiment only includes call length times from the appropriate type of call. Further embodiments have combinations of the above defined reordering schemes.

Figure 2:
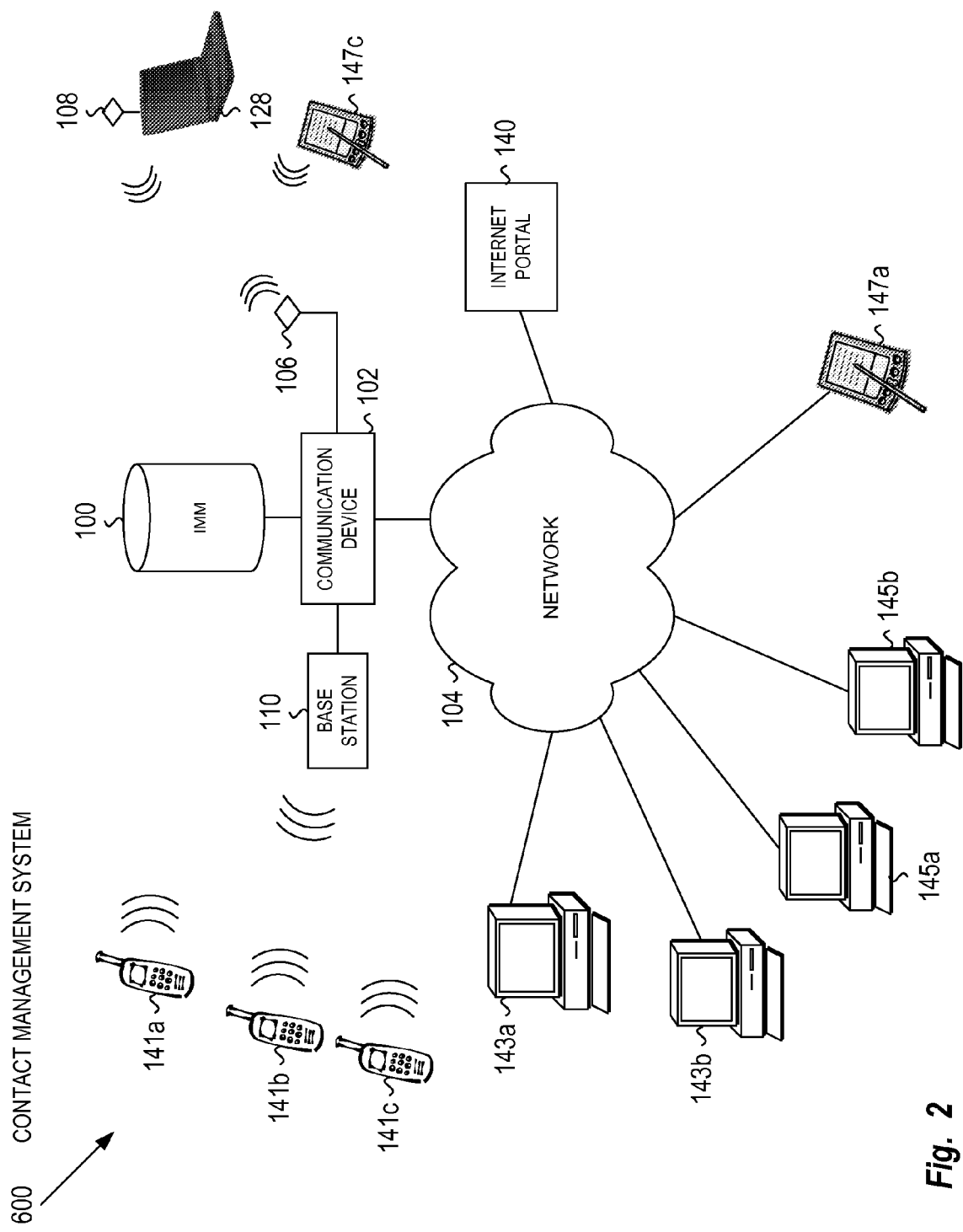
FIG. 2 is a system diagram of one embodiment of a contact and calendar record delivery system.

Referring to FIG. 2, in an alternate embodiment, a contact management system 600 maintains and distributes multiple users' contact and calendar records. The contact management system 600 of FIG. 2 is shown as having multiple users and is similar to the contact management system 101 described with respect to FIG. 1. It will be readily understood that the contact management system 600 could have any number of users. The contact management system 600 includes the information management module 100, the communication device 102, the base station 110, the wireless networking device 106 and the network 104, all of which have features and operate in the same manner as described in reference to the contact management system 100 of FIG. 1. Thus, the contact management system 600 is able to manage distribution of contact and calendar records for multiple different users by communicating with component devices belonging to multiple different users. As previously discussed, directives include information regarding authorizations or permissions as well as information pertaining to which device the records are distributed to, to ensure appropriate distribution of records. In some instances certain users are prevented from accessing or editing contacts to ensure that appropriate users' and devices receive information. In FIG. 2, a first user uses the cell phone 141*a*, the home PC 143*a*, the work PC 145*a* and the PDA 147*a*, while a second user uses cell phone 141*b*, home PC 143*b*, and work PC 145*b*, and a third user uses cell phone 141*c* and PDA 147*c*. In an alternate embodiment their may be more or fewer users and corresponding devices associated with each user.

The contact management system distributes contact information to websites on an autonomous basis. In one embodiment the contact management system distributes records which complete web forms such that each field in the web form corresponds to fields within a record. In an alternate embodiment the contact management system distributes records to websites whenever a relevant updated record is available for distribution.

In one embodiment an auto-fill mechanism for websites based on stored contact records is supported. This mechanism is applicable to merchant websites; however any website where contact related information is requested utilizes this feature. This mechanism automatically fills contact fields in websites forms which typically need user input to complete. The mechanism correlates the fields of a contact record in the contact management system 101 with the fields in a website form. In one embodiment an algorithm is used which detects which of the fields in the website form need input from a record which is stored on information management module 100 in the contact management system 101. This is accomplished through comparisons of the label in the website form to a list of common labels associated with the record in the contact management system. Through this comparison, the contact management system 101 sends information to the website form to promulgate the fields in the website form.

In one embodiment, initiation of the auto-fill mechanism is accomplished through either drag and drop initiation or file upload initiation. When using drag and drop initiation, a user selects the contact record from a database program holding the user's contacts by clicking on it. The user can then drag the representation of the contact record directly to the website form. Upon dropping the contact representation, the auto-fill mechanism automatically correlates the labels of the website form to the available fields of the contact management system and subsequently promulgates the contact data to the fields within the website form. An alternate embodiment uses file upload initiation which is initiated through a menu selection associate with the website. Once a menu item is selected, the web browser opens a file selection window for selecting the contact record corresponding to the information the user wants filled into the website form.

In one embodiment an auto-update mechanism for populating merchant websites and keeping them updated with current contact information is supported. This mechanism works in conjunction with the contact management system 101 or is utilized as a stand alone feature. The feature updates merchant websites with the most current updated contact information by distributing contacts on a local computer or information management module 100 to the merchant website whenever a contact is updated.

Figure 16:
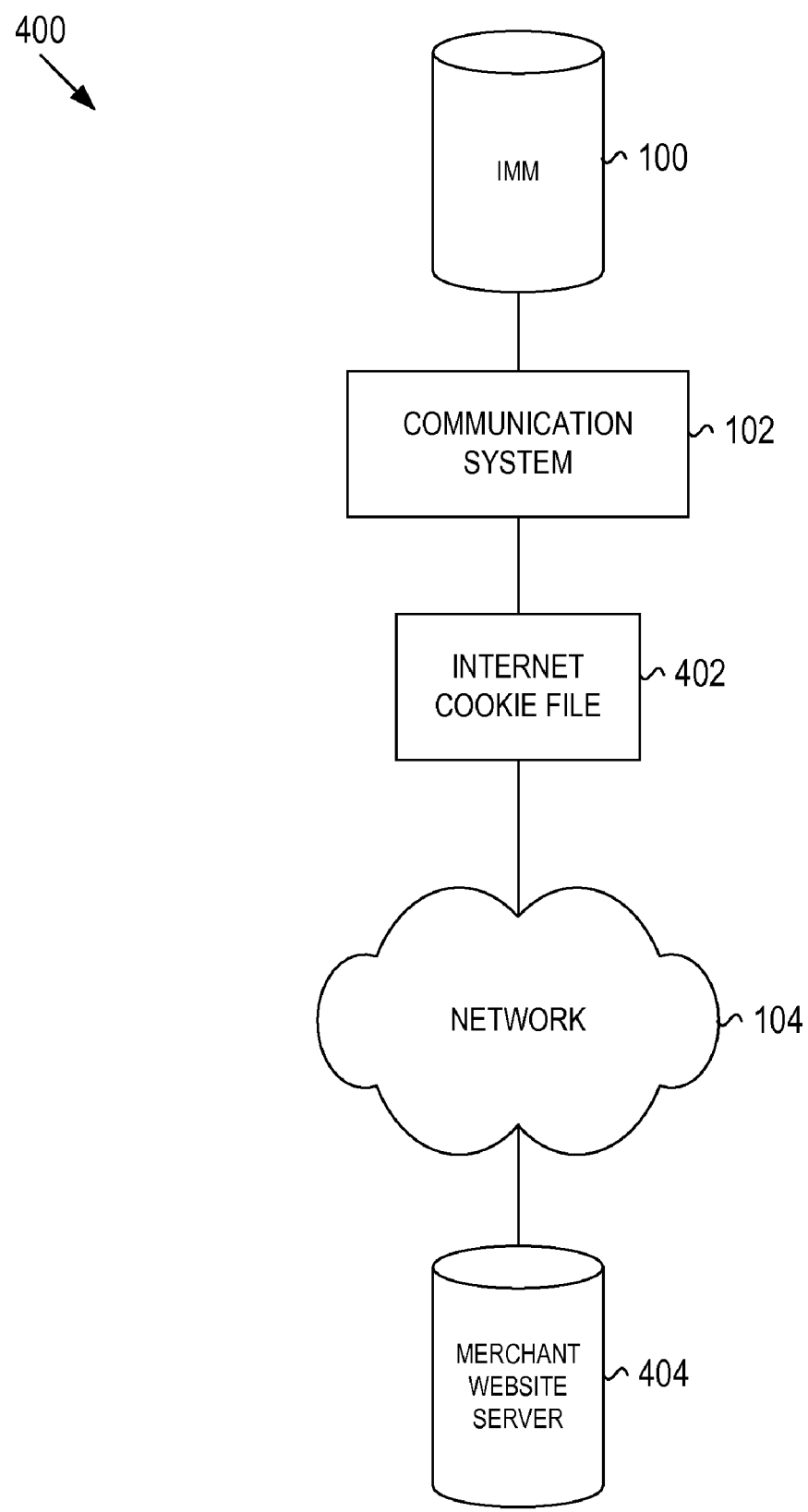
FIG. 16 is a system diagram of the auto-update feature where the updating is accomplished by updating Internet cookie files.

In one embodiment of the auto-update mechanism the system updates files known as Internet cookies, which are stored locally on the user's PC, to update the contact information. Internet cookies are files which contain information specific to a particular website. In one scenario, a user logs into a website and the users' personalized information is stored in an Internet cookie on the local machine. When the user logs onto this website, the web browser reads the Internet cookie file and utilizes it to read the personalized information. The personalized information may include contact information, calendar information, credit card information, web site personalization information or any other information the web page administrator includes. FIG. 16 illustrates an embodiment where Internet cookies are updated using the auto-update mechanism in conjunction with the contact management system. The information management module 100 contains the contact record to be distributed to the website and the communications system 102 updates the Internet cookie file 402. The Internet cookie file 402 is read and interpreted by an Internet browser which connects to the network 104. The network 104 communicates with the merchant website server 404 in order to allow the merchant website to use this data. If an Internet cookie contains information relating to contact information or billing information, that information is updated in the Internet cookie file 402 when the local computer or the information management module 100 receives an update. This ensures that when a user returns to that website the contact information and billing information is updated without any user input. The directives described above ensure that the appropriate websites and contacts stored in Internet cookies are updated.

Figure 17:
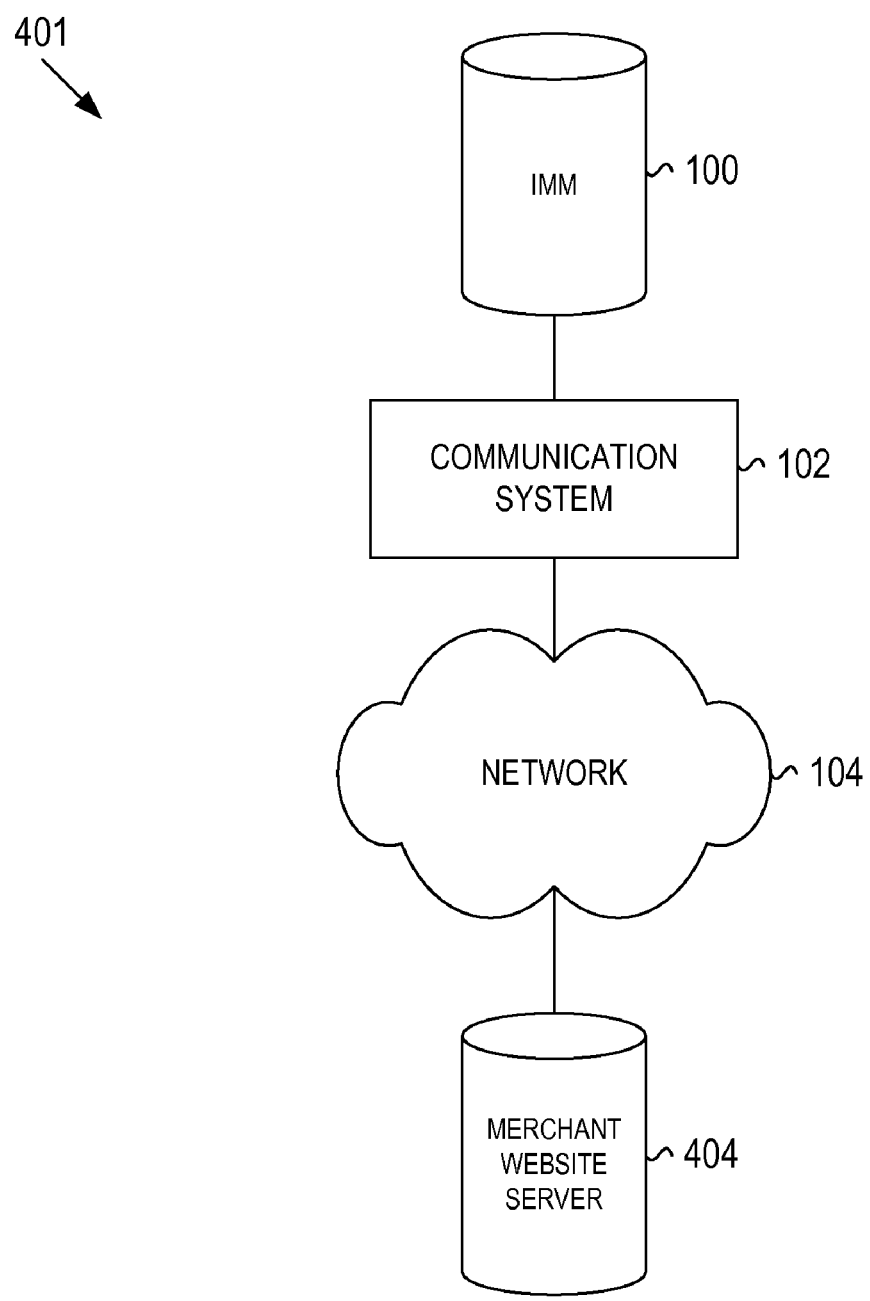
FIG. 17 is a system diagram of the auto-update feature where the updating is accomplished by updating a merchant website server.

In another embodiment of the auto-update mechanism, the website stores contact information on a server, rather than in an Internet cookie. FIG. 17 illustrates this embodiment. The information management module 100 sends the desired records to the communications system 102 which distributes the updated contact information to the merchant website server 404 via the network 104. The website server 404, in this embodiment, is acting like a component in FIG. 1. It has the ability to receive the contact record and update itself.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

I claim:

1. A method of displaying contact information on a mobile device, the method comprising:
    storing a plurality of contact records on a mobile device, wherein each of the plurality of contact records is associated with a contact and includes a name associated with the contact and contact information associated with the contact, wherein the plurality of the contact records comprises a first subset of contact records, and the contact information of each contact record included in the first subset of contact records includes geographic location information associated with the contact;
    determining a geographic location of the mobile device;
    comparing the geographic location of the mobile device to the geographic location of each of the contacts associated with the first subset of contact records;
    identifying a second subset of the contact records that are to be always displayed independent of the geographic location of the mobile device when contact records are displayed on the mobile device; and
    ordering the contact records on a display, such that the second subset of the contact records is displayed followed by the first subset of the contact records, the first subset of the contact records being displayed based on relative proximity of the contacts associated with the first subset of contact records to the geographic location of the mobile device.

2. The method of claim 1, wherein determining the geographic location of the mobile device includes receiving a representation of the geographic location of the mobile device as determined by a global positioning system.

3. The method of claim 1, further comprising:
    receiving representations of the geographic location of each of the contacts associated with the first subset of contact records as determined by a global positioning system.

4. The method of claim 1, wherein determining the geographic location of the mobile device includes receiving a representation of the geographic location of the mobile device as determined by cell phone tower triangulation.

5. The method of claim 1, further comprising:
    receiving representations of the geographic location of each of the contacts associated with the first subset of contact records as determined by cell phone tower triangulation.

6. The method of claim 1, further comprising:
    determining the geographic location of each of the contacts associated with the first subset of contact records based on a zip code contained in the corresponding one of the first subset of the contact records.

7. The method of claim 1, further comprising:
    determining the geographic location of each of the contacts associated with the first subset of contact records based on an area code and exchange contained in the corresponding one of the first subset of the contact records.

8. The method of claim 1, wherein determining the geographic location of the mobile device includes determining the geographic location of the mobile device by input from a user.

9. A computer-implemented method of displaying contact information on a mobile device, the method comprising:
    maintaining a plurality of contact records on a mobile device, wherein each of the plurality of contact records is associated with a contact and includes a name associated with the contact and contact information associated with the contact;
    automatically determining the geographic location of the mobile device;
    automatically determining respective geographic locations corresponding to contact records within a first subset of the plurality of contact records;
    comparing the geographic location of the mobile device to the respective geographic locations corresponding to the contact records within the first subset of the plurality of contact records;
    identifying a second subset of the plurality of contact records that are to be always displayed independent of the geographic location of the mobile device when contact records are displayed on the mobile device; and
    displaying the plurality of contact records on the mobile device, wherein the order of display is arranged so that the second subset of the plurality of contact records is followed by the first subset of the plurality of contact records ordered based on the relative proximity of the geographic location of the mobile device to the respective geographic locations corresponding to the contact records of the first subset of the plurality of contact records.

10. The method of claim 9, wherein determining the geographic location of the mobile device includes receiving a representation of the geographic location of the mobile device as determined by a global positioning system.

11. The method of claim 9, wherein determining respective geographic locations corresponding to the contact records within the first subset of the plurality of contact records includes receiving representations of the respective geographic locations corresponding to the contact records within the first subset of the plurality of contact records as determined by a global positioning system.

12. The method of claim 9, wherein determining the geographic location of the mobile device includes receiving a representation of the geographic location of the mobile device as determined by cell phone tower triangulation.

13. The method of claim 9, wherein, determining respective geographic locations corresponding to the contact records within the first subset of the plurality of contact records includes receiving representations of the respective geographic locations corresponding to the contact records within the first subset of the plurality of contact records as determined by cell phone tower triangulation.

14. The method of claim 9, wherein determining respective geographic locations corresponding to the contact records within the first subset of the plurality of contact records includes receiving a representation of the geographic location corresponding to each contact record within the first subset of the plurality of contact records based on a zip code contained in each contact record within the first subset of the plurality of contact records.

15. The method of claim 9, wherein determining respective geographic locations corresponding to the contact records within the first subset of the plurality of contact records includes determining the geographic location corresponding to each contact record of the first subset of the plurality of contact records based on an area code and exchange contained each contact record of the first subset of the plurality of contact records.

16. A contact information display system for displaying information on a mobile device, the system comprising:
   a storage device capable of storing a plurality of contact records, wherein each of the plurality of contact records is associated with a contact and includes a name associated with the contact and contact information associated with the contact, wherein the plurality of contact records comprises a first subset of the contact records having corresponding geographic locations and second subset of the contact records that are to be always displayed independently of the geographic location of the mobile device when contact records are displayed on the mobile device;
   an information management module configured to determine the relative proximity of the mobile device to the geographic locations corresponding to the first subset of the contact records; and
   a display module, configured to display the contact records in an order such that the second subset of the contact records is followed by the first subset of the contact records, the first subset of the contact records being displayed based on relative proximity of the geographic locations corresponding to the first subset of the contact records to the geographic location of the mobile device.

17. The system of claim 16, wherein the information management module is configured to determine the geographic locations corresponding to the first subset of the contact records via a global positioning system.

18. The system of claim 16, wherein the information management module is configured to determine the geographic locations corresponding to the first subset of the contact records via a cell phone tower triangulation.

19. The system of claim 16, wherein the information management module is configured to determine the geographic locations corresponding to the first subset of the contact records via a zip code.

20. The system of claim 16, wherein the information management module is configured to determine the geographic locations corresponding to the first subset of the contact records via an area code and exchange.

* * * * *

UNITED STATES PATENT AND TRADEMARK OFFICE
CERTIFICATE OF CORRECTION

| | | |
|---|---|---|
| PATENT NO. | : 8,150,422 B2 | |
| APPLICATION NO. | : 11/624935 | |
| DATED | : April 3, 2012 | |
| INVENTOR(S) | : Charles A. Eldering | |

It is certified that error appears in the above-identified patent and that said Letters Patent is hereby corrected as shown below:

On the title page, item (73), under "Assignee", in Column 1, Line 2, delete "Wilminton," and insert -- Wilmington, --, therefor.

In Column 2, Line 6, delete "example output" and insert -- example of the output --, therefor.

In Column 2, Line 13, delete "information." and insert -- information; --, therefor.

In Column 2, Line 15, delete "information." and insert -- information; --, therefor.

In Column 3, Line 61, delete "information" and insert -- information. --, therefor.

Signed and Sealed this
Twentieth Day of November, 2012

David J. Kappos
*Director of the United States Patent and Trademark Office*